United States Patent [19]

Braun et al.

[11] Patent Number: 4,573,565

[45] Date of Patent: Mar. 4, 1986

[54] CHAIN CONVEYOR DRIVER CONSTRUCTION

[75] Inventors: Ernst Braun; Gert Braun, both of Essen-Heisingen, Fed. Rep. of Germany

[73] Assignee: Halbach & Braun, Fed. Rep. of Germany

[21] Appl. No.: 127,841

[22] Filed: Mar. 6, 1980

[30] Foreign Application Priority Data

Mar. 6, 1979 [DE] Fed. Rep. of Germany ....... 2908683

[51] Int. Cl.[4] ............................................. B65G 19/10
[52] U.S. Cl. ................................... 198/719; 198/727; 198/734
[58] Field of Search ......................... 198/719, 727–729, 198/734, 748, 731, 733; 299/34, 43; 403/161, 408

[56] References Cited

U.S. PATENT DOCUMENTS

| | | | |
|---|---|---|---|
| 1,400,766 | 12/1921 | Peebles | 198/719 |
| 1,837,994 | 12/1931 | Preston | 198/749 X |
| 2,094,789 | 10/1937 | Gollatly | 198/734 X |

FOREIGN PATENT DOCUMENTS 1369212 10/1974 United Kingdom ................. 198/728

*Primary Examiner*—Douglas D. Watts

*Attorney, Agent, or Firm*—McGlew and Tuttle

[57] ABSTRACT

A driver for a chain conveyor which is adapted to run in a conveyor trough which has side guide walls comprises a driver arm portion having outer side edges which terminate in a polygonal pin portion which tapers inwardly in lateral and longitudinal directions toward its outer end. A guide shoe has an inner side face with a recess into which the pin portion of the arm extend and the guide shoe is pivotally supported on the arm pin portion by a pin or sleeve element. The guide shoe includes an inwardly extending nose portion which rides between side edges of a U-shaped recess of the arm portion. Surfaces of the nose portion and the U-shaped recess of the arm defining recesses and stops for limiting the pivotal movement of the shoe. Both the shoe and the polygonal pin portion of the driving arms have aligning bores which are oblong so that the pivotal support may be shifted in lateral outer or inner directions so as to vary the clearance between outer circularly cylindrical portions of the polygonal pin portion and the guide shoe during pivotal movement of the shoe. The shoe has an outer lateral edge which engages in the side guide walls and the angular position of this edge with respect to the guide walls may be shifted to vary the cutting angle of the guide shoe. In addition, the side areas of the guide shoes may be shifted during the pivoting to vary the scraping angle.

2 Claims, 3 Drawing Figures

CHAIN CONVEYOR DRIVER CONSTRUCTION

FIELD AND BACKGROUND OF THE INVENTION

The invention relates in general to conveyors and particularly to a new and useful driver for chain conveyors with driver arms and guide shoes attached at the end on the driver arms, which are detachably secured on the driver arms by means of vertical connecting elements passing through the driver arms, and which are guided in angle sections of the conveyor trough.

By chain conveyors the framework of the invention single-chain conveyors, as well as doublechain conveyors and outer chain conveyors are included.

In conventional chain conveyors, the drivers scraping on the trough bottom and in the angle sections are subject to considerable wear and must therefore be frequently replaced. For this reason drivers have already been developed which carry, at the end, plastic caps and guide shoes which can be attached on the driver arms and be replaced. The plastic caps are secured detachably, but without play, on the driver arms by means of tongue and groove joints, vertical bores through the tongue and groove joints, and adapter sleeves or dowel pins. Such drivers; as well as conventional embodiments where the guide shoes are not replaceable, but are integral with the driver arms; can only be inserted in one direction of motion if we work with the scrape angles formed by the driver arms and the guide shoes. Since the driver arms and the guide shoes are generally asymmetrical, the scraping or conveying power is considerably reduced during the return of the drivers. But return is frequently required, e.g. when cutting up or down between end and head zones. Beyond that, the known drivers are not free of drawbacks either insofar as they only have a constant scrape angle. The same drawbacks also appear with regard to the rear free cutting angle.

SUMMARY OF THE INVENTION

The invention provides a driver for chain conveyors, which is characterized in both directions of motion by a separately adjustable and therefore, always optimum scrape angle and rear free cutting angle, and hence permits reversal of the direction of conveyance without reducing the scraping or conveying output.

The invention solves this problem in that the driver arms and the guide shoes are axially symmetrical and that the guide shoes are mounted on the driver arms for swinging movement about swivel axes formed by the connection elements in a given swivel range in the driver plane, forming in the swung-out state in the direction of motion on their front side a given scrape angle and on their back a given free cutting angle with the driver arms. These features of the invention have the effect that the driver according to the invention, can be engaged on the chain strands, independent of the direction of motion of the strands, due to its axial symmetry. Thus the driver according to the invention is particularly easy to assemble. In addition, a given scrape angle and a given free cutting angle are always established during the forward and return motion, namely when the guide shoes swing out correspondingly on the driver arms.

The automatic adjustment of the scrape angle and of the free cutting angle leads to favorable starting moments, because the guide shoes swing out so to speak flexibly on the driver arms in dependence on the direction of motion of the drivers and can yield between the starting position and the maximum swivel position in dependence on the material to be conveyed until they have reached their end positions, that is the guide shoes have swung out completely in dependence on the direction of motion. At any rate conveyance both in the forward and in the return direction is possible with the drivers according to the invention, due to the swingable mounting of the guide shoes on the drivers arms. According to another feature of the invention, which is also of importance by itself in combination with the claimed measures, the guide shoes are also mounted on the driver arms, swinging about a horizontal swivel axis extending orthogonally to the vertical swivel axis and transverse to the direction of motion forming a cardanic joint. The gimbal mounting of the guide shoes permits, apart from the adjustment of an optimum scrap and free cutting angle, adaptation of the driver to the trough profile, particularly in the range of the joints between the individual trough sections when passing through depressions and saddles. As known, such depressions and saddles cause bends between the individual trough sections in the range of the joints, to which the guide shoes can now adapt themselves, due to the gimbal mounting, so that proper guidance is ensured for the driver according to the invention, even in these critical regions. Actually sliding movement over the joints is now achieved in contrast to the otherwise jerky movement.

Other features essential for the invention are described below. Thus the invention provides that the driver arms have, at their ends, polygonal pins for attachment on the guide shoes, and that the guide shoes have polygonal recesses with larger cross sections than the polygonal pins, thus ensuring a given clearance of motion between the guide shoes and the driver arms. This clearance is so selected that a polygon face of the polygonal pin always bears on a polygon face of the polygonal recesses. The guide shoes can thus be rolled off on the polygonal pins clockwise or counter-clockwise, about the horizontal swivel axis transverse to the direction of motion of the driver. The invention also recommends that the polygonal pins have openings for the connection elements secured in the guide shoes, whose cross section is greater than that of the connection elements, so that the connection elements pass through the openings with a given clearance of motion. This way a relatively simple support and detachable connection of the guide shoes on the driver arms is achieved by means of a Cardan joint.

In order to be able to absorb transverse stresses in the angle sections, the openings are designed according to the invention as oblong holes, the polygonal pins at the end face as joint heads, and the polygonal recesses of the guide shoes in the lowest region as joint sockets. The driver, according to the invention, is thus capable of compensating even extreme transverse stresses without damaging the gimbal mounting of the guide shoes on the driver arms. Beyond that, the connection elements are preferably designed as shear pins or sleeves and form a present breaking point so that bending of the driver arms is in any case prevented under excess stress. The swivel range of the guide shoes on the driver arms can be limited by special stops. The guide shoes are preferably made of a particularly stress resistant material, which is characterized by great strength and ductility, e.g. chromium hard manganese.

The advantages achieved by the invention are seen substantially in the fact that a driver for chain conveyors, like single-chain conveyors, double-chain conveyors or double outer chain conveyors, is obtained which is characterized in both directions of motion of the driver by an optimum scrape and free cutting angle, because the guide shoes are swingably mounted on the driver arms, and in a preferred embodiment in gimbal fashion, and the scrape and free cutting angles can therefore adjust themselves independent of the direction of motion. Besides, proper guidance of the guide shoes and adaptation of the driver to the trough profile are ensured, even at the joints between the conveyor trough sections taking into account bends appearing there during the passage through the depressions and saddles. Furthermore, the driver according to the invention permits reversal of the conveyance, so that conveyance both in forward and return direction is ensured, such as in cutting up and down, while maintaining an optimum scraping and conveying output.

Accordingly, it is an object of the invention to provide a driver for a chain conveyor which is adapted to run in a conveyor trough which has side walls forming guides and which comprises a driver arm portion having outer side edges terminating in a pin portion and a guide shoe having an inner side face with a recess into which the pin portion extends, the guide shoe being supported on the pin portion of the arm for pivotal movement and wherein the guide shoe and the pin portion of the arm define opposing surfaces therebetween limiting the pivotal movement and wherein the outer end surface of the shoe defines a cutting surface which is shiftable upon pivoting to vary the cutting engagement of the surface with the conveyor trough side guide walls and the sides of the shoe define respective scrape angles with the trough side guide walls which are also variable upon pivoting of the guide shoe.

A further object of the invention is to provide a driver for a chain conveyor which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
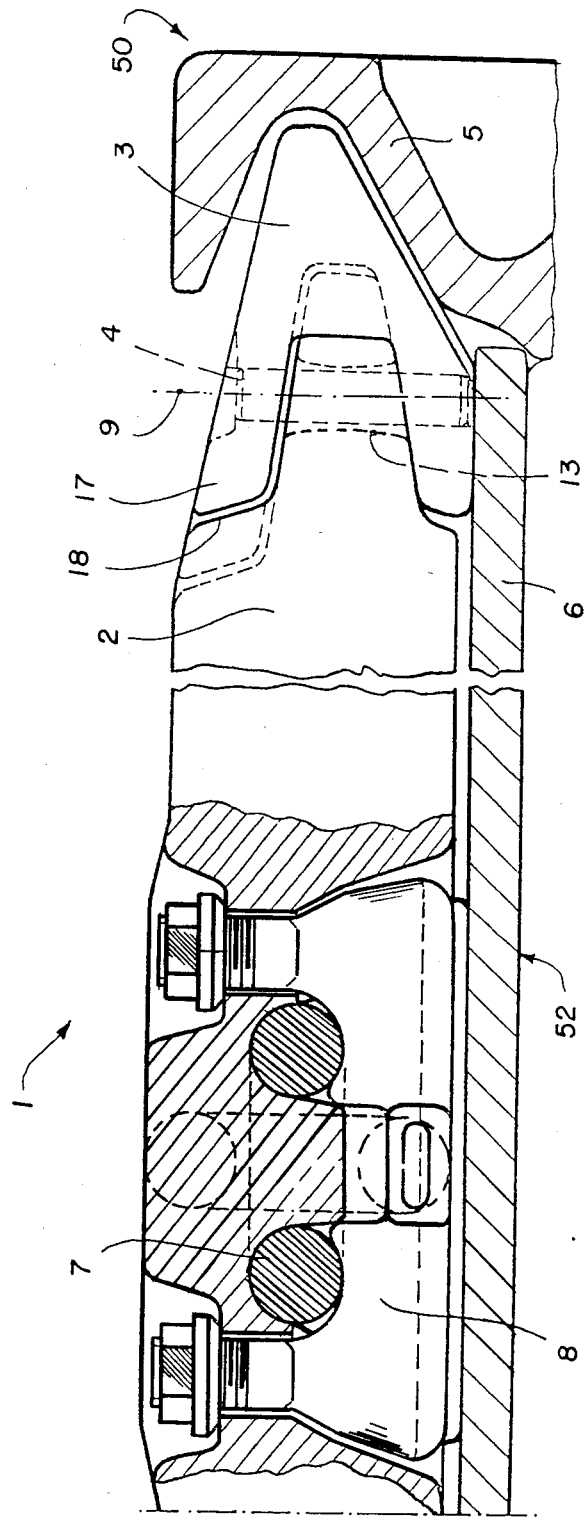
FIG. 1 is a partial lateral sectional and elevational view of a chain conveyor having a driver constructed in accordance with the invention.
Figure 3:
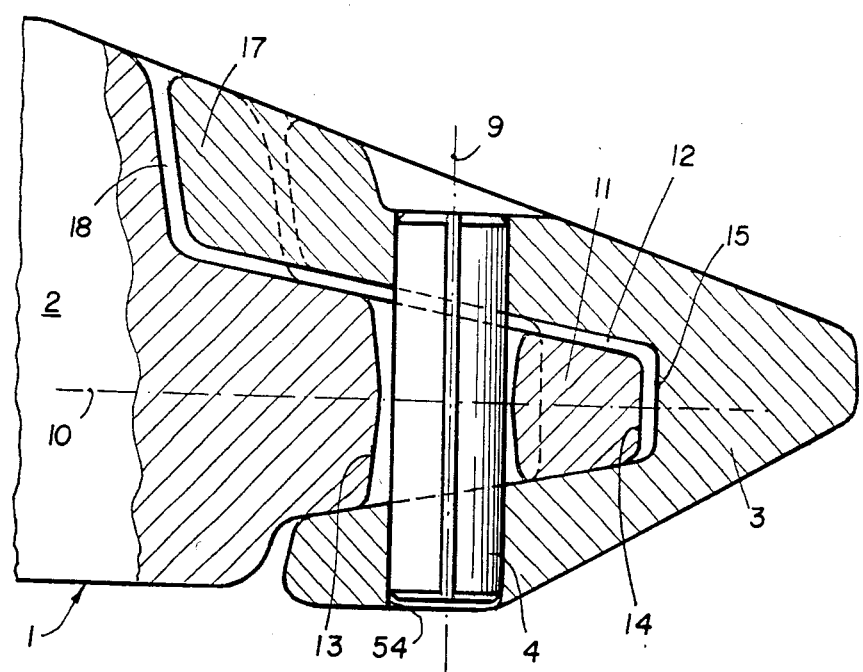
FIG. 3 is a sectional view of the driver shown in FIG. 2.
Figure 2:
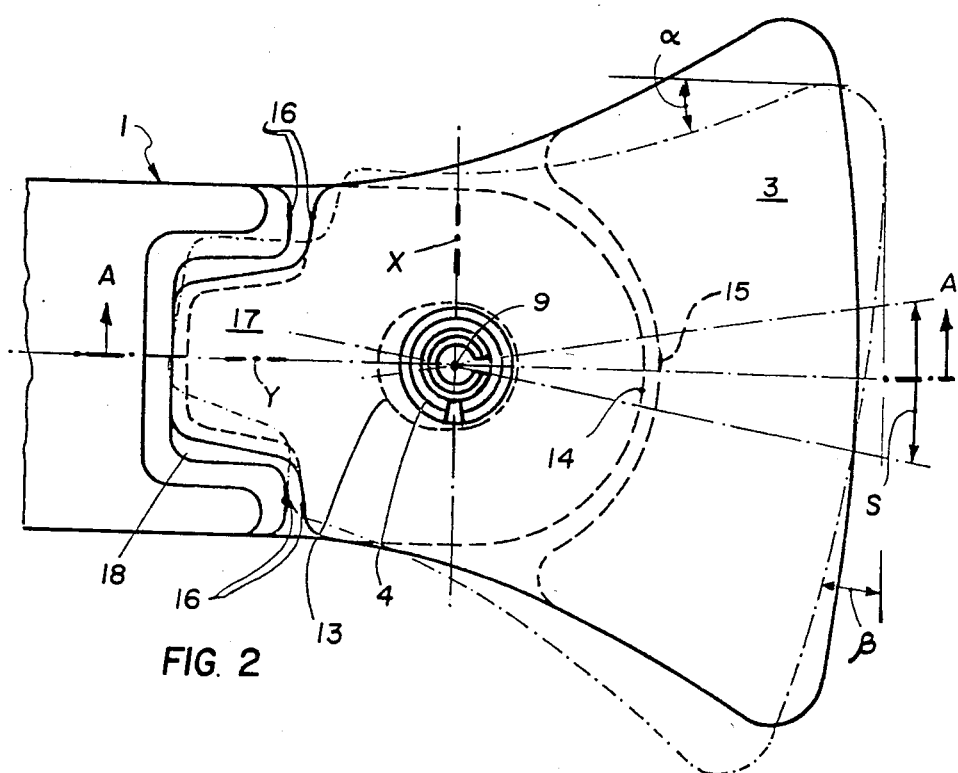
FIG. 2 is a partial top plan view of the driver shown in FIG. 1.

Referring to the drawings, in particular the invention embodied therein comprises a driver, generally designated 1 for a chain conveyor, generally designated 50 which is adapted to run in a conveyor trough generally designated 52 which has side guide walls 5 extending along each side of a conveyor trough bottom 6.

The figures show a driver generally designated 1 for a chain conveyor 50. The driver 1 has driver arm portions 2 on each side of a conveyor chain 7. The outer ends of arm portions 2 carry guide shoes 3 which are detachably mounted on the driver arm portions 2 by means of connection elements or pivot pins 4 passing through the associated driver arm portion 2 and which are guided in angle side sections 5 of a conveyor 52 along each side of a trough bottom 6. The represented driver 1 is intended for a single chain conveyor which has its chain 7 running centrally on the bottom 6, Each driver 1 is secured to the chain by means of a central chain yoke 8. In principal, driver 1 could also be used in double-center-and double outer chain conveyors.

Driver arm portions 2 and guide shoes 3 are axially symmetrical, that is, they are symmetrical with regard to transverse axis y extending in the longitudinal direction of driver arms 2.

Guide shoes 3 are mounted on driver arm portions 2 for swinging about a vertical swivel axis 9 formed by connection element 4 and in a given swivel range or pivot angle S in the driver plane. In the swung-out state, guide shoes 3 and driver arm portions 2 form on their front side in the direction of motion shown by the arrow A, given scrape angle alpha ($\alpha$). The side edge or back may be shifted through a given free cutting angle beta ($\alpha$). Between the starting position in solid lines and the swung-out position in dash dot lines of guide shoes 3, automatic adjustment of the scrape angle and of the free cutting angle is probable in the starting phase.

Guide shoes 3 are also mounted on driver arm portions 2 for swinging about a swivel axis 10 extending orthoganally to vertical swivel axis 9 and transverse to the direction of motion forming a cardan joint. The driver arm portions 2 also carry polygonal pin or edge portions 11 for attachment of the guide shoes 3, and the guide shoes 3 have polygonal recesses 15 with a larger cross section than each polygonal pin 11 into which each pin is inserted. This provides a clearance of motion between the guide shoes 3 and the driver arm portions 2. Polygonal pin portions 11 have openings 13 for the passage of the connection element 4 which is secured in the associated guide shoe 3. The cross section of each guide shoe opening 13 is greater than that of connection elements 4 so that the element 3 passes through the opening 13 with a given clearance of motion.

According to a preferred embodiment of the invention, the guide shoes 3 have, in the range of polygonal recesses 12 on their top and underside openings 54 for connection elements 4, which are then secured in polygonal pin portions 11. In this embodiment (not shown), the cross section of the openings on the top and underside of guide shoes 3 is then likewise greater than that of connection elements 4. Openings 13 and 54 are, in both cases, designed as oblong holes extending transverse to the direction of motion, and polygonal pin portions 11 are designed at their ends as joint heads 14, and in addition, polygonal recesses in the lowest region of the guide shoes define joint sockets 15. Under transverse stresses, guide shoes 3 are so pressed on driver arms 2, due to the guidance in the oblong holes, that joint heads 14 bear against joint sockets 15 and can therefore, absorb high transverse stresses. The swivel range of guide shoes 3 on driver arms 2 is limited by stop surfaces 16. The connection elements 4 are designed as shear pins or sleeves and form a preset breaking point. Guide shoes 3 engage at least on their top side with a nose portion 17 in a large U-shaped recess 18 whose U-shaped arm portions extend transversely to the direction of motion and form stops 16 for the sides of nose 17 of the guide shoes.

While specific embodiments of the invention have been shown and described in detail to illustrate the application of the principles of the invention, it will be understood that the invention may be embodied otherwise without departing from such principles.

What is claimed is:

1. A driver for a chain conveyor adapted to run in a substantially horizontal driven direction in a conveyor trough having opposite side guide walls extending in the driven direction, comprising:

a driver arm having an outer side portion;

a guide shoe horizontally pivotally mounted about a substantially vertical axis to said outer side portion and having an inner side face with a recess into which said outer side portion extends;

a substantially vertically connecting element detachably and pivotally extending through said outer side portion and detachably connected to said guide shoe for pivotally connecting said guide shoe to said driver arm;

said guide shoe guided for motion in one of said side guide walls;

said driver arm and connected guide shoe being axially symmetrical about a vertical plane which is normal to said driven direction;

said guide shoe and said outer side portion having opposing surfaces therebetween for limiting pivotal movement of said guide shoes relative to said driver arm to a selected range;

said guide shoe having outer end surfaces defining forwardly facing and rearwardly facing cutting surfaces in said driven direction;

said guide shoe pivoting within said selected range and with movement in said driven direction to a predetermined scrape angle between the forwardly facing cutting surface and a transverse line to said driven direction and a predetermined guide clearance angle between the rearwardly facing cutting surface and said driven direction;

said driver arm outer side portion being tapered outwardly and said guide shoe recess being tapered inwardly and substantially conforming in shape to said outer side portion, said recess being larger in cross-section than said outer side portion for establishing a predetermined clearance of motion between said guide shoe and said driver arm;

an outer surface of said outer side portion and a facing inner surface of said recess being circular, said vertical connecting element extending through said outer side portion and being connected to said guide shoe for permitting relative horizontal pivotal motion of said outer side portion and said guide shoe;

a pair of stop surfaces defined on said guide shoe and an opposing pair of stop surfaces defined on said outer side portion of said driver arm for limiting the pivotal movement of said guide shoe to said selected range; and a projection extending from an upper surface of said guide shoe toward said driver arm, said driver arm having a U-shaped recess for receiving said projection of a size large enough to permit pivotal motion of said guide shoe through said selected range, said U-shaped recess of said driver arm having side walls which extend transversely to said driven direction, said stop surfaces of said driver arm formed adjacent said U-shaped recess.

2. A driver for a chain conveyor adapted to run in a conveyor trough having side guide walls, comprising a driver arm portion having outer side edges terminating in a pin portion, a guide shoe having an inner side face with a recess into which said pin portion extends, pivot means pivoting said guide shoe on said pin portion, said guide shoe and said pin portion defining opposing surfaces therebetween limiting pivotal movement of said guide shoe relative to said arm portion, the outer end surface of said guide shoe defining a cutting surface which is shiftable upon pivoting to vary the cutting engagement of the guide shoe with the conveyor trough guide walls and the sides of said guide shoe defining respective scrape angles with the troughs of side guide walls which is also changeable upon pivoting of said guide shoe relative to said arm portion, said pin portion being of polygonal shape and tapering inwardly in lateral and longitudinal directions toward its outer end, said guide shoe recess being similarly shaped and being of a greater dimension than said polygonal pin portion so that there is a clearance of motion therebetween, said pivot means comprising oblong bores defined in at least one of said pin portion and said guide shoes which are aligned including a pin fitted in said bores being of a diameter smaller than said bores so that there is a clearance of motion therebetween, said guide shoe including an inner end face with an outwardly extending nose having side walls forming stop parts, said driver arm including a recess with lateral side walls forming stops opposing the stop walls of said guide shoes and limiting the pivotal movement thereof, said guide shoes having a wall in the recess thereof of curved cylindrical formation in said pin portion having an outer end wall of cylindrical curved formation.

* * * * *